United States Patent
Kageyama et al.

(10) Patent No.: US 10,658,682 B2
(45) Date of Patent: May 19, 2020

(54) FUEL CELL STACK

(71) Applicant: NISSAN MOTOR CO., LTD., Yokohama-shi, Kanagawa (JP)

(72) Inventors: Kazuhiro Kageyama, Kanagawa (JP); Kazuyuki Sato, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/999,811

(22) PCT Filed: Oct. 17, 2016

(86) PCT No.: PCT/JP2016/080703
§ 371 (c)(1),
(2) Date: Aug. 20, 2018

(87) PCT Pub. No.: WO2017/145436
PCT Pub. Date: Aug. 31, 2017

(65) Prior Publication Data
US 2019/0341634 A1 Nov. 7, 2019

(30) Foreign Application Priority Data
Feb. 23, 2016 (JP) ................................. 2016-031632

(51) Int. Cl.
*H01M 8/0273* (2016.01)
*H01M 8/2483* (2016.01)
(Continued)

(52) U.S. Cl.
CPC ......... *H01M 8/0273* (2013.01); *H01M 8/242* (2013.01); *H01M 8/2475* (2013.01); *H01M 8/2483* (2016.02); *H01M 2008/1095* (2013.01)

(58) Field of Classification Search
CPC ............. H01M 8/0273; H01M 8/0271; H01M 8/2483; H01M 8/242; H01M 8/2475; H01M 2008/1095
(Continued)

(56) References Cited

U.S. PATENT DOCUMENTS 6,716,550 B1 * 4/2004 Kirby .................. H01M 8/0271
429/509
2009/0004540 A1 1/2009 Shizuku et al.
(Continued)

FOREIGN PATENT DOCUMENTS

EP 1465272 A2 * 10/2004 .......... H01M 8/0273
JP 2008-059760 A 3/2008
(Continued)

*Primary Examiner* — Amanda C. Walke
(74) *Attorney, Agent, or Firm* — Foley & Lardner LLP

(57) ABSTRACT

A fuel cell stack FS includes: a stack A that includes a single cells C that are stacked, each of the single cells including a frame 2 that holds an outer periphery of a membrane electrode assembly 1 and a pair of separators 3, 4 sandwiching the membrane electrode assembly 1 and the frame 2; and a case 50 that houses the stack A. The frame 2 comprises a protrusion 11 that protrudes outward from an outer periphery of a frame body 2A beyond an outer peripheral edge of the pair of separators 3, 4. A protrusion length of the protrusion 11 is greater than at least a gap between the frame 2 and one of the pair of separators 3, 4, and the protrusion 11 is bendable with respect to the frame body 2A. The protrusions prevent a contact between the separators 3, 4 of the single cell C and a contact between the end faces of the separators 3, 4 and the case 50 so as to prevent a short circuit of the single cell C.

10 Claims, 17 Drawing Sheets

(51) Int. Cl.
*H01M 8/242* (2016.01)
*H01M 8/2475* (2016.01)
*H01M 8/1018* (2016.01)

(58) Field of Classification Search
USPC .......................................... 429/452
See application file for complete search history.

(56) References Cited

U.S. PATENT DOCUMENTS

| | | |
|---|---|---|
| 2013/0115541 A1 | 5/2013 | Oku et al. |
| 2015/0037648 A1* | 2/2015 | Nguyen ............... H01M 10/625 |
| | | 429/120 |
| 2015/0037662 A1* | 2/2015 | Pinon .................. H01M 2/0237 |
| | | 429/179 |
| 2017/0263965 A1* | 9/2017 | Jeong .................. H01M 8/0273 |
| 2019/0173102 A1* | 6/2019 | Ichihara ................ H01M 8/242 |

FOREIGN PATENT DOCUMENTS

| | | |
|---|---|---|
| JP | 2010-114004 A | 5/2010 |
| JP | 4496732 B | 7/2010 |
| JP | 2015-146230 A | 8/2015 |
| KR | 2012-0055398 A | 5/2012 |
| WO | WO-2011/152405 A1 | 12/2011 |

* cited by examiner

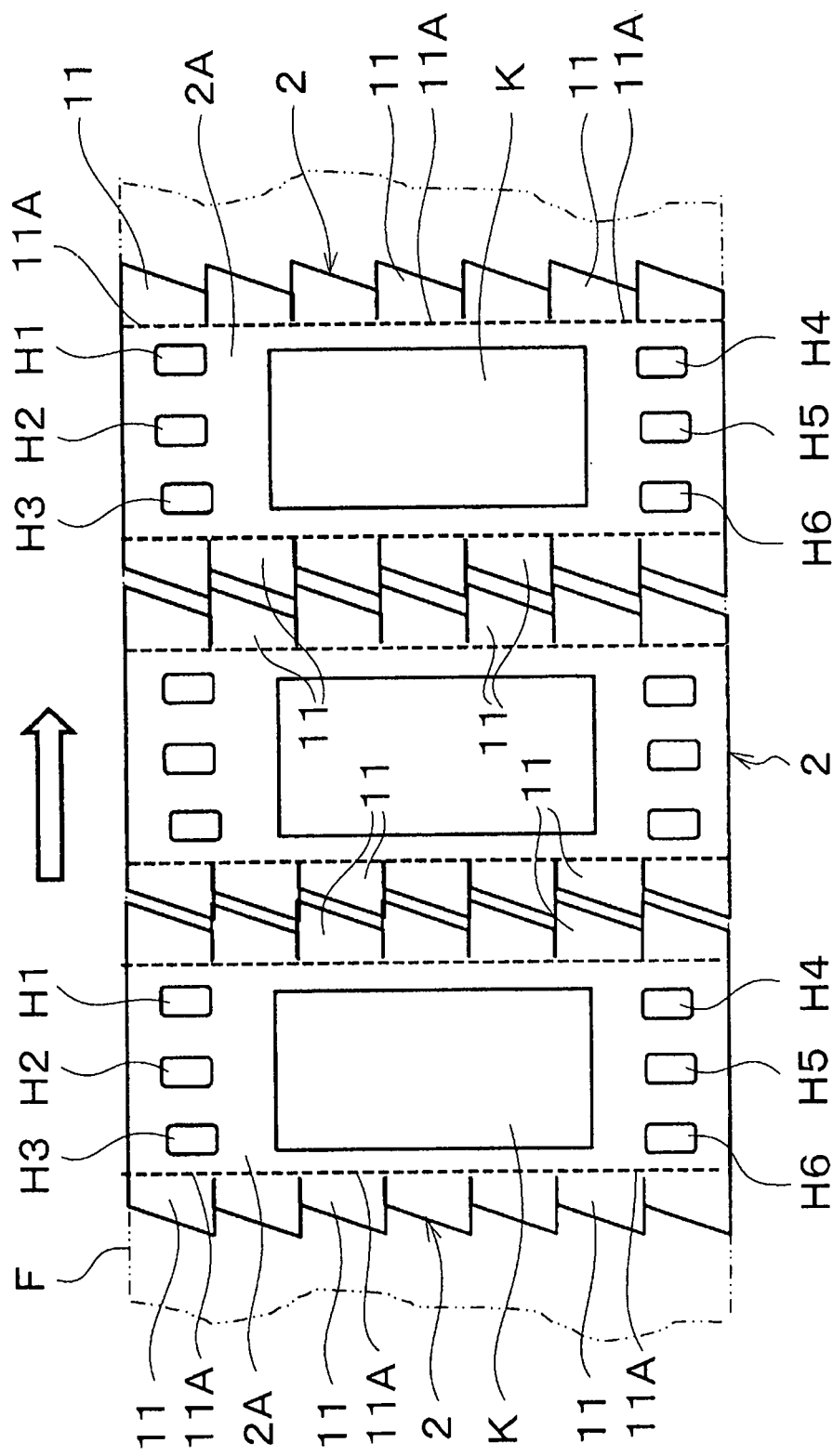

FUEL CELL STACK

TECHNICAL FIELD

The present invention relates to a fuel cell stack that comprises a stack of single cells.

BACKGROUND ART

Conventional fuel cell stacks are described, for example, in Patent Document 1. The fuel cell stack of Patent Document 1 has a stacked cell structure in which assemblies with a reinforcing frame in the outer periphery of an electrolyte (electrolyte membrane) and separators with gas channels formed thereon are stacked. In the fuel cell stack, the separators are disposed inside the reinforcing frames such that the separators do not interfere with the reinforcing frames or that the outer peripheries of the separators are flush with the inner peripheries of the reinforcing frames. The fuel cell stack can maintain its power generation efficiency since deformation of the electrolytes is prevented.

CITATION LIST

Patent Documents

Patent Document 1: JP 4496732B

SUMMARY OF INVENTION

Technical Problem

In fuel cell stacks, a stack is usually housed in a case in order to secure the waterproofness and air-tightness of the stack or to protect single cells. However, such fuel cell stacks may suffer from a short circuit that is due to a contact between separators of the single cells or a contact between the separators and the case.

The present invention has been made in view of the above-described circumstance, and an object thereof is to provide a fuel cell stack comprising a stack of single cells and a case housing the stack, in which a short circuit can be prevented.

Solution to Problem

The fuel cell stack of the present invention comprises: a stack that comprises single cells that are stacked, each of the single cells comprising a frame that holds an outer periphery of a membrane electrode assembly and a pair of separators sandwiching the membrane electrode assembly and the frame; and a case that houses the stack. The frame of each single cell comprises a protrusion that protrudes outward from an outer periphery of a frame body that constitutes the frame, beyond an outer peripheral edge of the pair of separators. The protrusion length of the protrusion is greater than at least a gap between the frame and the edge of one of the pair of separators, and the protrusion is bendable with respect to the frame body.

Advantageous Effects of Invention

In the fuel cell stack of the present invention, the protrusion of each frame protrudes from the outer periphery of each of the single cells. The protrusion length of the protrusion is greater than at least the gap between the frame and the edge of one of the pair of separators. Accordingly, when the protrusion is bent with respect to the frame body in the fuel cell stack, it covers an end face of one of the separators of the own single cell and an end face of one of the separators of an adjacent single cell. This structure continues in the stacking direction where the protrusions of the stack are aligned. When the stack is housed in a case, the protrusions intervene between the end faces of the separators and the case.

In the fuel cell stack, this allows the protrusions tb prevent a contact between separators of each single cell and a contact between an end face of a separator and the case so as to prevent a short circuit.

BRIEF DESCRIPTION OF DRAWINGS

FIG. 6 is a plan view of a frame of a fuel cell stack according to a fourth embodiment of the present invention.

DESCRIPTION OF EMBODIMENTS

First Embodiment

Figure 1A:
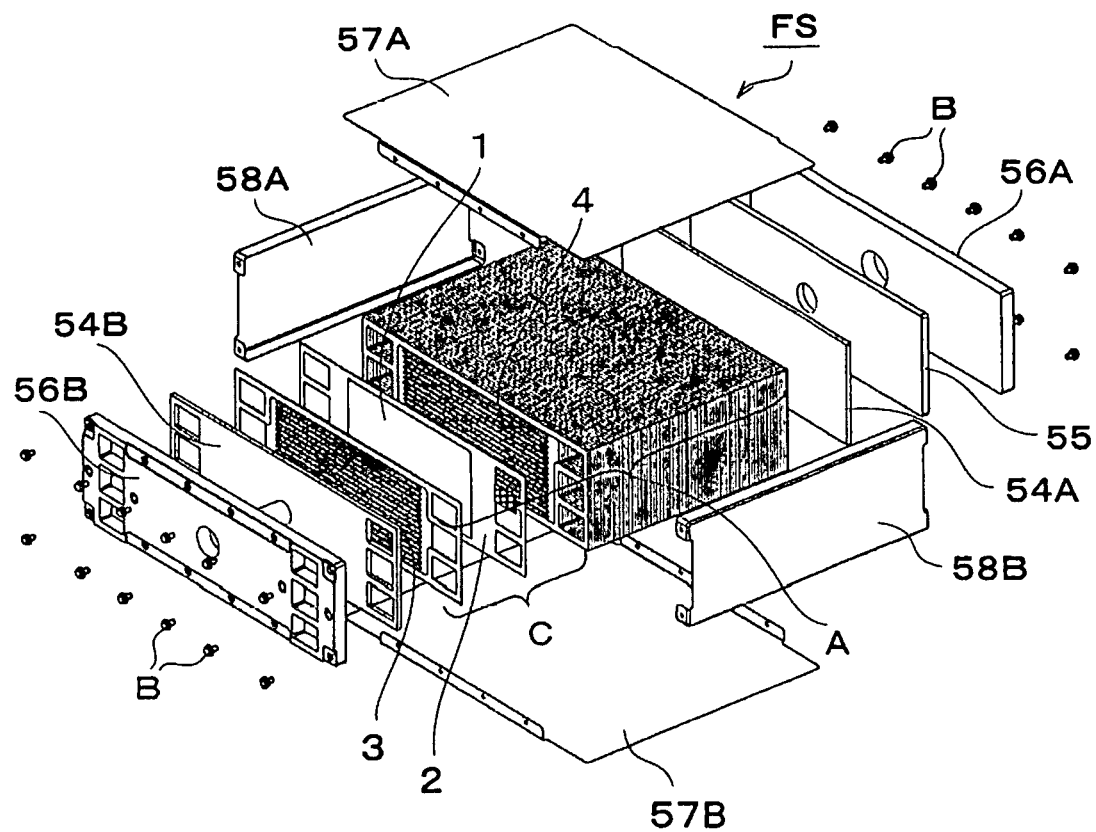
FIG. 1A is a perspective view and FIG. 1B is an exploded perspective view of a fuel cell stack according to a first embodiment of the present invention.

A fuel cell stack FS as illustrated in FIG. 1A comprises rectangular single cells C that are stacked to constitute a stack. On one end (right end in the figure) in the stacking direction of the stack A, an end plate 56A is disposed via a current collector plate 54A and a spacer 55. On the other end in the stacking direction of the stack A, an end plate 56B is disposed via a current collector plate 54B.

Further, the fuel cell stack FS comprises fastening plates 57A, 57B disposed on respective faces (top and bottom faces in FIG. 1A and FIG. 1B) corresponding to the long sides of single cells C, and reinforcing plates 58A, 58B disposed on respective faces corresponding to the short sides. The fastening plates 57A, 57B and the reinforcing plates 58A, 58B are each coupled to both end plates 56A, 56B by bolts.

Figure 1B:
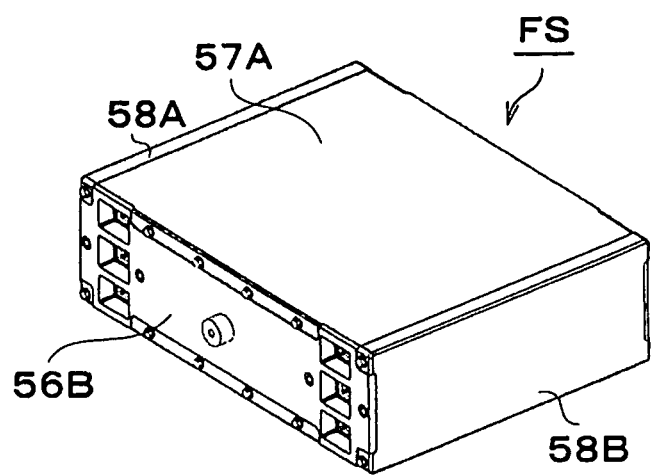

The fuel cell stack FS has such a case-integrated structure as illustrated in FIG. 1B, which restrains and presses the stack A in the stacking direction to apply a predetermined contact surface pressure to the individual single cells C so that the gas sealing property, the electrical conductivity and the like are maintained at high level. In the fuel cell stack FS of the embodiment, the fastening plates 57A, 57B and the reinforcing plates 58A, 58B constitute a case 50 that houses the stack A.

As illustrated in FIG. 1A, each of the single cells C comprises a frame 2 that holds an outer periphery of a membrane electrode assembly 1, a pair of separators 3, 4 disposed on opposite faces of the membrane electrode assembly 1 and the frame 2. In the single cell C, a channel for anode gas (hydrogen-containing gas) is formed between the membrane electrode assembly 1 and one of the separators, or the separator 3, and a channel for cathode gas (oxygen-containing gas, e.g. air) is formed between the membrane electrode assembly 1 and the other of the separators, or the separator 4.

The membrane electrode assembly 1, which is generally referred to as an MEA, comprises an electrolyte membrane of a solid polymer that is held between an anode electrode and a cathode electrode. The electrode comprises a catalyst layer for a catalytic reaction and a gas diffusion layer for promoting diffusion of the anode gas or the cathode gas.

The frame 2 is constituted by an insulative thin film, e.g. a plastic film. The frame 2 is integrated with the outer periphery of the membrane electrode assembly 1 disposed inside the frame 2 so as to hold the membrane electrode assembly 1. The detailed structure of the frame 2 will be described later.

Each of the separators 3, 4, which is made of stainless steel, is formed in a suitable shape by press working or the like. The center area thereof corresponding to the membrane electrode assembly 1 has an uneven cross-sectional shape that continues in the longitudinal direction. In the portions of the separators 3, 4 having the uneven cross-sectional shape, the ribs of the corrugation are in contact with the membrane electrode assembly 1 so that the gas channels are formed in the longitudinal direction between the grooves and the membrane electrode assembly 1.

Each of the frame 2 and the separators 3, 4 have manifold holes H1 to H6 that communicate with corresponding holes to form manifolds for fluids when the single cells C are stacked. In the illustrated example, manifold holes H1 to H3 and H4 to H6 are formed such that three manifold holes are arranged along each short side of the frame 2 and the separators 3, 4.

For example, the manifold holes H1 to H3 on one short side in the figures are configured respectively to supply the cathode gas (H1), to supply cooling fluid (H2) and to discharge the anode gas (H3). The manifold holes H4 to H6 on the other short side in the figures are configured respectively to supply the anode gas (H4), to discharge the cooling fluid (H5) and to discharge the cathode gas (H6). The positional relationship of the manifold holes H1 to H6 may be partly or fully reversed in respect of supply and discharge.

Figure 2A:
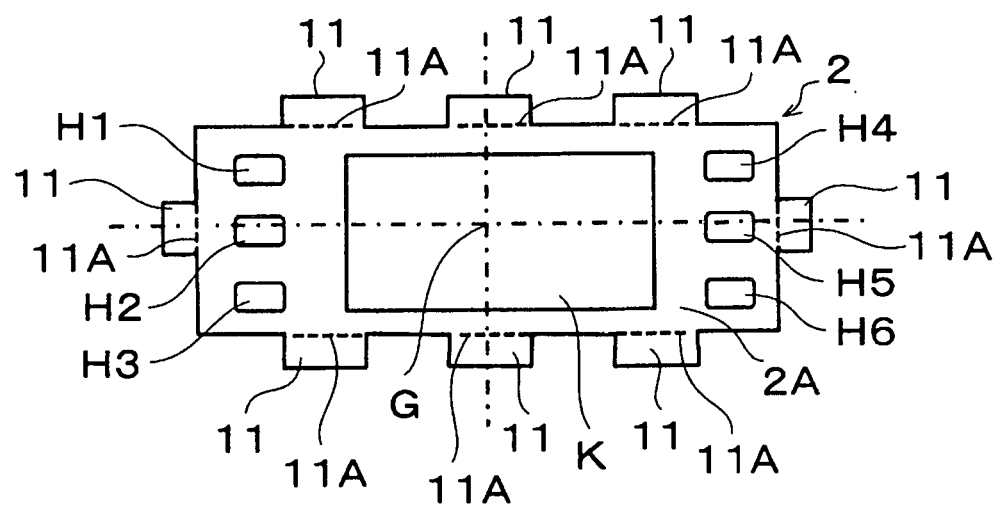
FIG. 2A is a plan view of a frame.
Figure 2B:
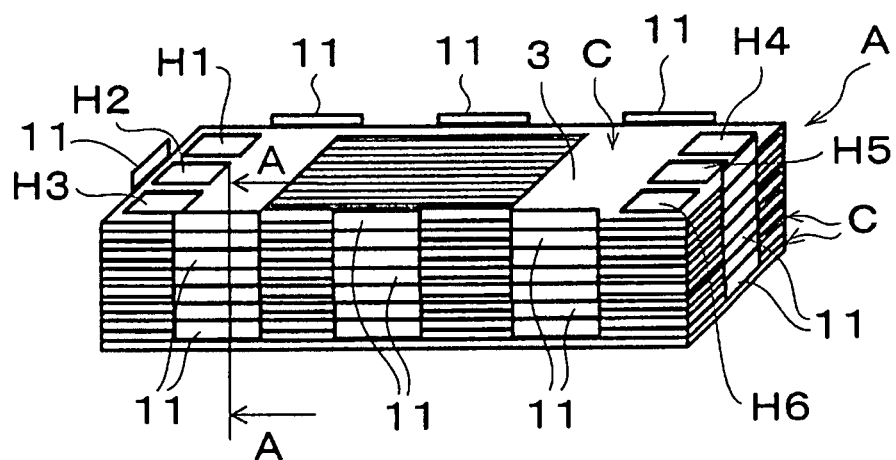
FIG. 2B is a perspective view of a stack of the first embodiment and FIG. 2C is a cross-sectional view taken along the line A-A in FIG. 2B.
Figure 2C:
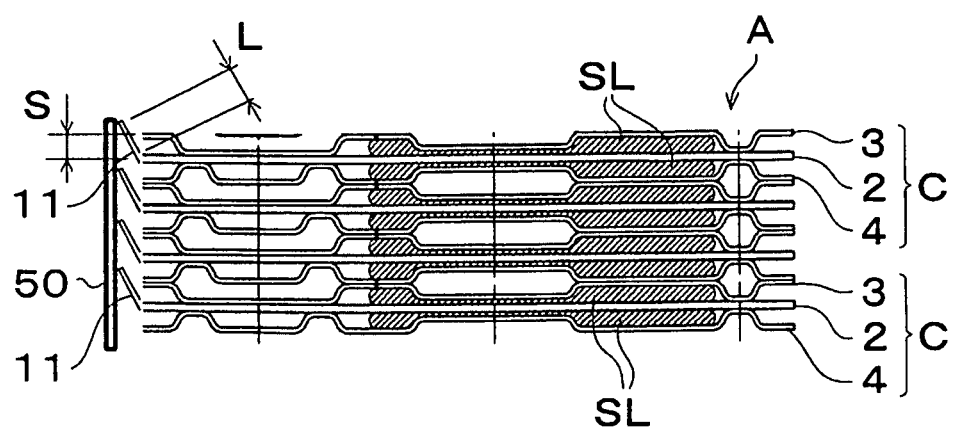

The frame 2 is hermetically joined to the separators 3, 4 at their outer periphery and the peripheries of the manifold holes H1 to H6 with adhesive sealing members (see reference sign SL in FIG. 2A to FIG. 2C). The sealing member disposed around each of the manifold holes H1 to H6 is partly open to form inlets or outlets so as to direct fluids to the corresponding channels.

In the fuel cell stack FS, the frame 2 of each single cell C comprises protrusions 11 that protrude outward from the outer periphery of a frame body 2A that constitutes the frame, beyond the outer peripheral edges of the separators 3, 4 as illustrated in FIG. 2A. In the illustrated example, the frame 2 comprises eight rectangular protrusions 11 in total, specifically three in each long side and one in a center of each short side of the frame body 2A. The three protrusions 11 in each long side are arranged at regular intervals. All the frames 2 of the single cells C have the same configuration.

That is, the protrusions 11 are disposed symmetrically with respect to the in-plane center of gravity G of the frame body 2A. As illustrated in FIG. 2C, the protrusion length L of each of the protrusions 11 is greater than at least the gap S between the frame 2 and the edge of one of the pair of separators 3, 4. Further, the protrusions 11 are bendable with respect to the frame body 2A.

In a more preferred embodiment, each of the protrusions 11 of the frame 2 may comprise respective bendable portion 11A at the bottom part thereof that is processed so as to subserve the protrusions 11 to be bent. For example, each of the bendable portions 11A may be constituted by a groove (thin portion) formed by press working, cutting or the like, a crease, a perforation, or the like.

In another more preferred embodiment, each of the protrusions 11 of the frame 2 has a protrusion length L that a protrusion 11 overlaps at least a part of another protrusion 11 of an adjacent single cell C as illustrated in FIG. 2B when the protrusions 11 are bent.

In the fuel cell stack FS having the above-described configuration, the protrusions 11 of each of the frames 2 protrude from the outer peripheries of each single cell C of the stack. The protrusion length L of each of the protrusions 11 is greater than at least the gap between the frame 2 and the edge of one of the separators 3, 4, or the protrusion length L may be yet greater.

Accordingly, in the fuel cell stack FS, when the protrusions 11 are bent upward (or downward) as illustrated in FIG. 2B and FIG. 2C, they cover the end face of the upper separator 3 of its own single cell C and at least the end face of the lower separator 4 of an adjacent upper single cell C.

In the fuel cell stack, FS, when each of the protrusions 11 has a protrusion length L longer than the above-described protrusion lengths, the upper end of each of the protrusions 11 overlaps the lower end of another protrusion 11 of an adjacent upper single cell. This structure continues in the stacking direction where the protrusions 11 are aligned in the stack A.

In the fuel cell stack FS, when stack A is housed in the case 50, the protrusions 11 intervene between the end faces of the separators 3, 4 and the case 50, which is shown in FIG. 2C that depicts a part of the case 50.

In the fuel cell stack FS, this allows the protrusions 11 to prevent a contact between the separators 3, 4 of each of the single cells C and a contact between the end faces of the separators 3, 4 and the case 50 so as to prevent a short circuit. Furthermore, in the fuel cell stack FS, the protrusions 11 intervene between the end faces of the separators 3, 4 and the case 50. This allows minimizing the gap between the case 50 and the stack A and holding the stack A while securing the insulation. Therefore, high vibration resistance and high impact resistance can be achieved.

As other possible measures to prevent a short circuit in the single cells, for example, an additional member may be disposed around the outer periphery of the frames 2 to cover the end faces of the separators 3, 4, or the stack A may be coated and surrounded with an insulating material. However, using such an additional member or insulating coating results in the increased number of parts or the increased number of production steps, or even the increase outer size of the stack A. In contrast, in the above-described fuel cell stack FS, the protrusions 11 that are integrated with each of the frames 2 can prevent a short circuit without any other member or insulating coating. This can contribute to an improvement of the productivity, a reduction of the production cost, a reduction in size of the stack A, and the like.

In the fuel cell stack FS, the frame 2 comprises the bendable portion 11A that is disposed at the bottom part of each of the protrusions 11 that is processed so as to subserve the protrusions 11 to be bent. This enables bending the protrusions 11 very easily, and a further improvement in the workability is therefore achieved.

In the fuel cell stack FS, each of the protrusions 11 has the protrusion length L that when the protrusion is bent with respect to the frame, the protrusion 11 overlaps at least a part of another protrusion 11 of an adjacent single cell C when the protrusions 11 are bent. Accordingly, the end faces of the separators 3, 4 are completely covered where the protrusions 11 are aligned. In the fuel cell stack FS, this can further enhance the function of preventing a short circuit in the single cells C.

In the fuel cell stack FS, the protrusions 11 are disposed symmetrically with respect to the in-plane center of gravity G of the frame body 2A. That is, the protrusions 11 are disposed all around the single cells C in a good balance. This can further enhance the function of preventing a short circuit and the functions of vibration resistance and the impact resistance.

FIG. 3A to FIG. 9B illustrate fuel cell stacks according to second to seventh embodiments of the present invention. In the following embodiments, the same reference signs denote the same components as those in the first embodiment, and the detailed description thereof is omitted.

Second Embodiment

Figure 3A:
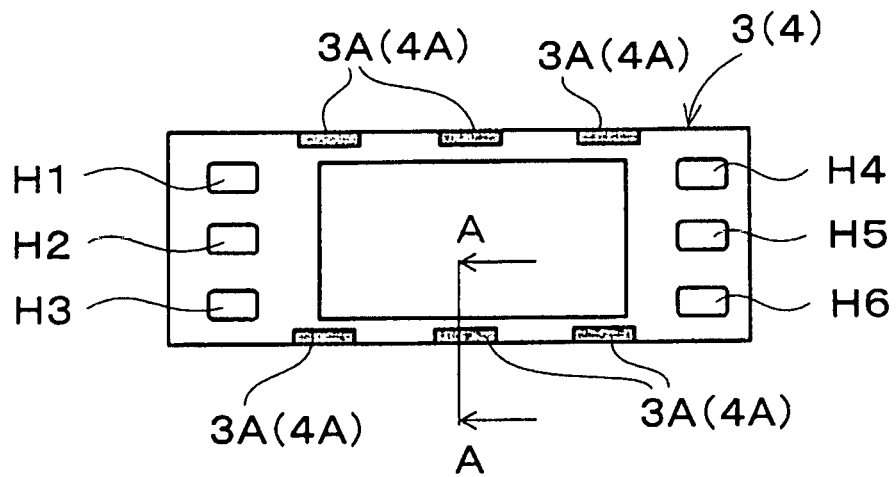
FIG. 3A is a plan view of a separator of a fuel cell stack according to a second embodiment of the present invention and FIG. 3B is a cross-sectional view taken along the line A-A in FIG. 3A.
Figure 3B:
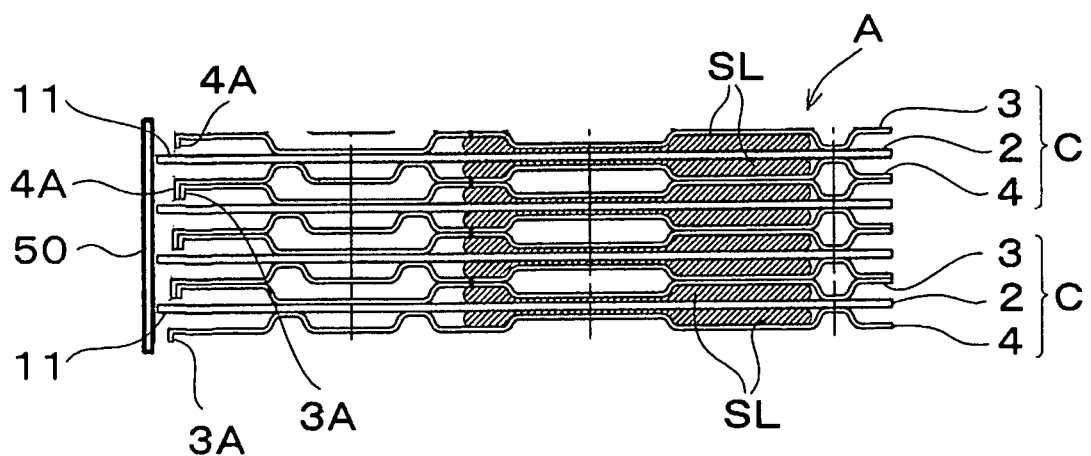

A fuel cell stack FS as illustrated in FIG. 3A and FIG. 3B is configured such that a frame 2 of each single cell C comprises protrusions 11 at the outer periphery, and separators 3, 4 comprise bent portions 3A, 4A at the outer peripheries that are bent downward (or upward). In the illustrated example, three bent portions 3A or 4A are formed in each of both long sides of the separators 3, 4. The bent portions 3A, 4A are configured such that when the single cells C are stacked, the bent portions 4A of the lower separator 4 of a single cell C engage with the bent portions 3A of the upper separator 3 of an adjacent single cell C so as to cover the outer sides of the bent portions 3A.

In the fuel cell stack FS having the above-described configuration, the protrusions 11 can prevent a short circuit as with the previously-described embodiment. Further, in the fuel cell stack FS, the bent portions 3A, 4A can increase the rigidity of the peripheral parts of the separators 3, 4 and fix the relative position of single cells C that are adjacent in the stacking direction. This can enhance the function of preventing a short circuit in the single cells and the functions of the vibration resistance and the impact resistance.

Other Examples of Protrusions

FIG. 4A to FIG. 4H illustrate other examples of the protrusions 11 of the frame 2. Any of various shapes and any of various bendable portions 11A can be employed for the protrusions 11. The protrusion 11 in FIG. 4A has a rectangular shape and comprises the bendable portion 11A at the bottom part as in the previously-described embodiment. The protrusion 11 in FIG. 4B has a triangular shape and comprises the bendable portion 11A at the bottom part.

Figure 4A:
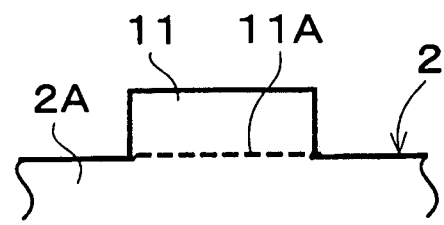
FIG. 4A to FIG. 4H are plan views of eight other examples of protrusions.
Figure 4B:
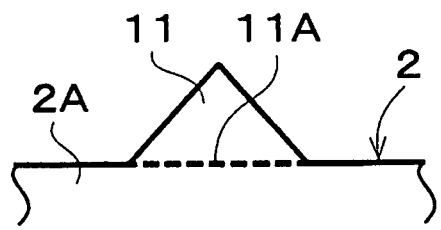
Figure 4C:
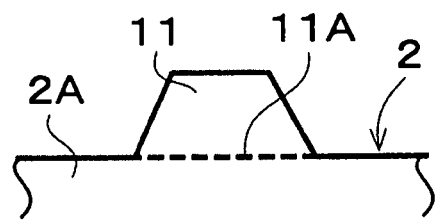
Figure 4D:
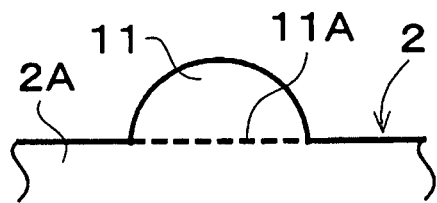
Figure 4E:
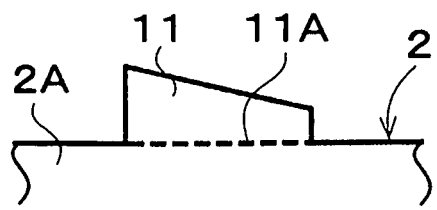

The protrusion 11 in FIG. 4C has a trapezoidal shape with an upper base at the distal end and comprises the bendable portion 11A at the bottom part (lower base). The protrusion 11 in FIG. 4D has a semicircular shape and comprises the bendable portion 11A at the bottom part. The protrusion 11 in FIG. 4E has a trapezoidal shape with a leg at the distal end and comprises the bendable portion 11A at the bottom part.

Figure 4F:
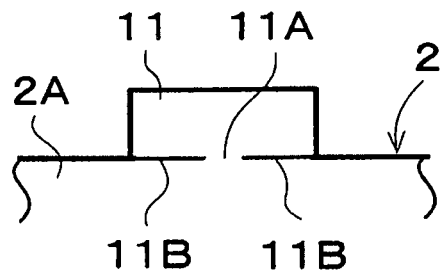
Figure 4G:
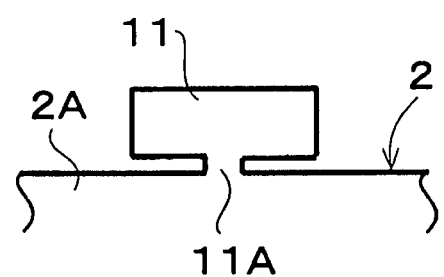
Figure 4H:
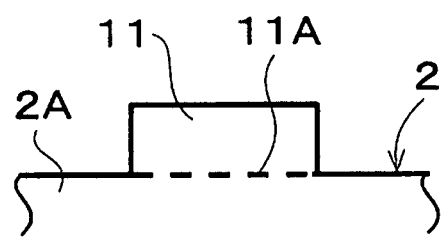

The protrusion 11 in FIG. 4F has a rectangular shape and comprises the bendable portion 11A at the bottom part that comprises a pair of slits 11B, 11B. The protrusion 11 in FIG. 4G has a rectangular shape and comprises a notched portion connecting the center in the width direction to the frame body 2A as the bendable portion 11A. The protrusion 11 in FIG. 4H has a rectangular shape and comprises the bendable portion 11A at the bottom part that is bent by hot press working.

As illustrated in FIG. 4A to FIG. 4H, any of various shapes and any of various bendable portions 11A are employed in the protrusions 11 of the frame 2. Therefore, the protrusions 11 are readily bendable with respect to the frame body 2A and have the function of preventing a short circuit in the single cells C. It should be understood well that any other configuration (the configurations in FIG. 4A to FIG. 4H or another configuration) that can prevent a short circuit of the single cells C can be employed in the protrusions 11.

Third Embodiment

Figure 5:
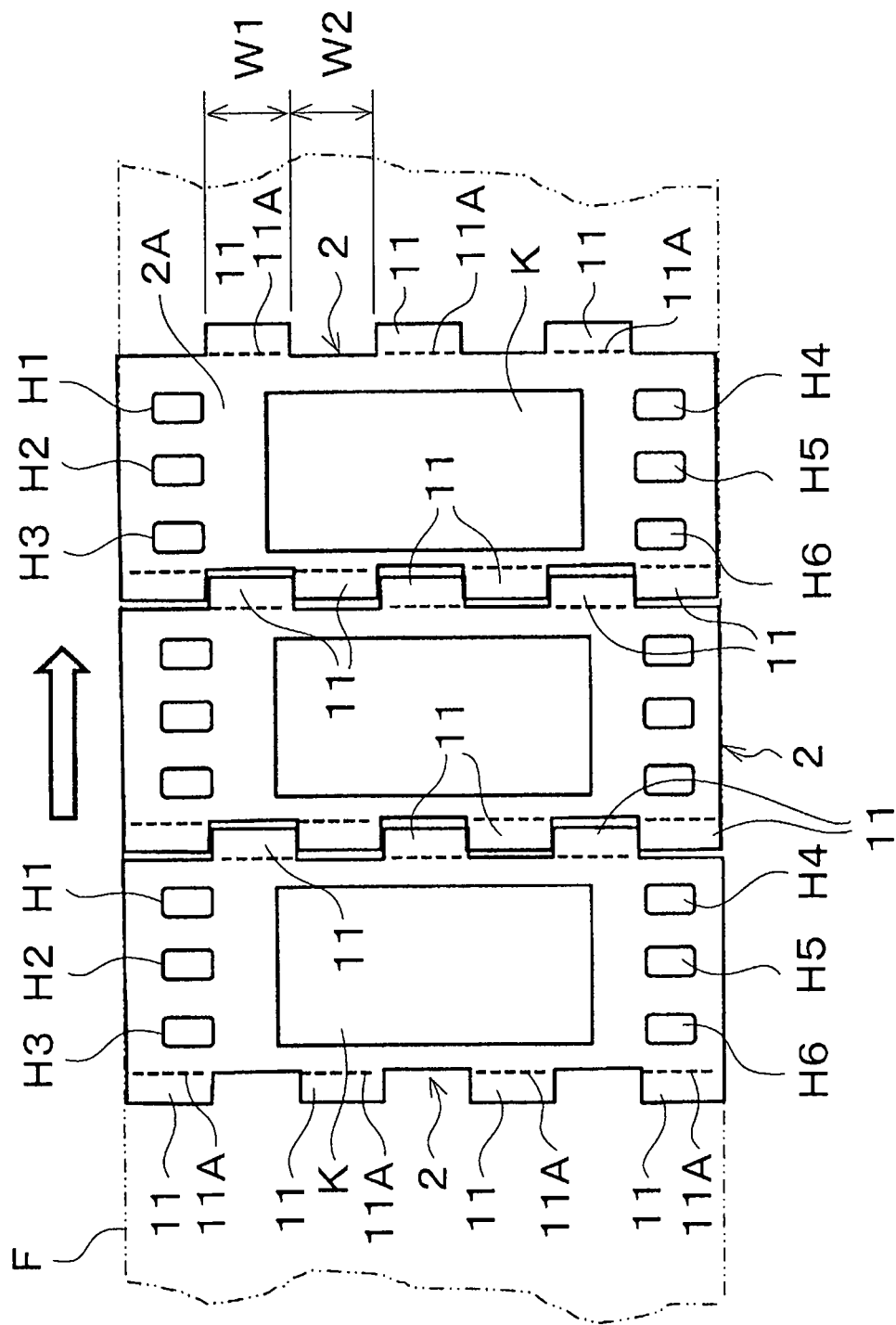
FIG. 5 is a plan view of a frame of a fuel cell stack according to a third embodiment of the present invention.

A frame 2 of a fuel cell stack in FIG. 5 is configured such that a frame body 2A has a rectangular shape, and protrusions 11 are arranged in at least parallel two sides in a staggered pattern.

In the illustrated example, the frame 2 comprises the protrusions 11 in both long sides. Specifically, three protrusions 11 are disposed in one long side, and four protrusions 11 are disposed in the other long side. All the protrusions 11 have the same width W1. The width W1 is equal to the distance W2 between adjacent protrusions 11 in the same side.

When the above-described frames 2 are used in single cells C and the single cells C are formed in a stack A, the protrusions 11 of the frames 2 prevent a short circuit in the single cells C as with the previously-described embodiments.

As illustrated by the virtual line in the figure, the frame 2 is cut out of a continuous frame material F, and the protrusions 11 are disposed in the sides (long sides) that are perpendicular to the continuing direction (direction of the arrow in the figure) of the frame material F. For example, the frame material F is a ribbon that is wound in a roll shape. An opening K for mounting a membrane electrode assembly, manifold holes H1 to H6 and the protrusions 11 are formed by press cutting.

Since the protrusions 11 are arranged in one and the other long sides of the frame 2 in a staggered pattern, frames 2 are arranged on the frame material F such that the protrusions 11 in a frame 2 fit in the gaps between the protrusions 11 of an adjacent frame 2. This allows using the frame material F for the frames 2 without any waste, and an improvement of the material yield and a reduction in the production cost can therefore be achieved.

Fourth Embodiment

A frame 2 of a fuel cell stack in FIG. 6 is configured such that a frame body 2A has a rectangular shape, and the frame 2 comprises protrusions 11 in both long sides. In the illustrated example of the frame 2, seven protrusions 11 are tightly disposed in each of the long sides. Each of the protrusions 11 has a trapezoidal shape with a leg at the distal end, and the oblique sides of the protrusions 11 in one long side are parallel to the oblique sides of the protrusions 11 on the other long side.

When the above-described frames 2 are used in single cells C and the single cells C are formed in a stack A, the protrusions 11 of the frames 2 can prevent a short circuit in the single cells C as with the previously-described embodiments. Further, the frames 2 are cut out of a continuous frame material F as illustrated by the virtual line in the figure.

The frames 2 are arranged on the frame material F such that the oblique sides of the protrusions 11 of a frame 2 fit the oblique sides of the protrusions 11 of an adjacent frame 2. As with the previously-described embodiment, this allows using the frame material F for the frames 2 without any waste, and an improvement of the material yield and a reduction in the production cost can therefore be achieved.

Fifth Embodiment

Figure 7A:
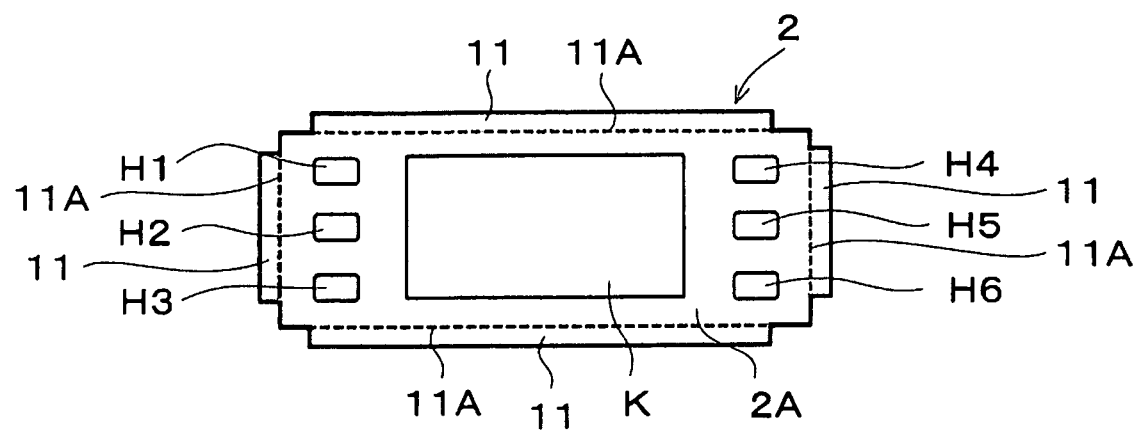
FIG. 7A is a plan view of a frame and FIG. 7B is a perspective view of a stack of a fuel cell stack according to a fifth embodiment of the present invention.
Figure 7B:
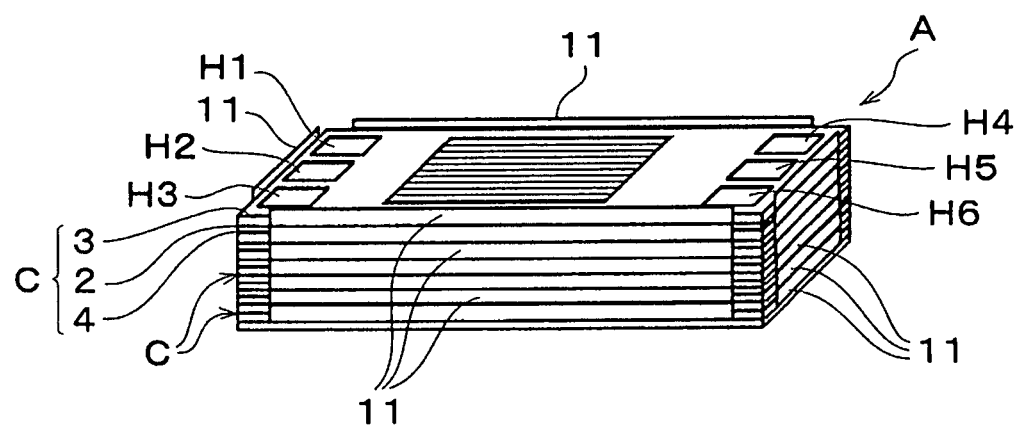

A frame 2 of a fuel cell stack in FIG. 7A and FIG. 7B have a rectangular shape and comprises four protrusions 11 respectively in the four sides. In the illustrated example, the width of the protrusions 11 of the frame 2 is slightly less than the overall length of the corresponding sides. While there are portions with no protrusion 11 around the corners of the frame body 2A in the illustrated example, the protrusions 11 may also be provided over the entire length of the sides.

When the above-described frames 2 are used in single cells C and the single cells C are formed in a stack A, the protrusions 11 of the frames 2 can prevent a short circuit in the single cells C as with the previously-described embodiments. In the fuel cell stack with the above-described frames 2, the protrusions 11 can cover a large part of the end faces of separators 3, 4, and the protrusions 11 can intervene between a large part of the end faces of the separators 3, 4 and a case 50. In the fuel cell stack, this can prevent a contact between the separators 3, 4 of the single cells C and a contact between the end faces of the separators 3, 4 and the case 50 more surely so as to prevent a short circuit in the single cells more surely.

Sixth Embodiment

Figure 8A:
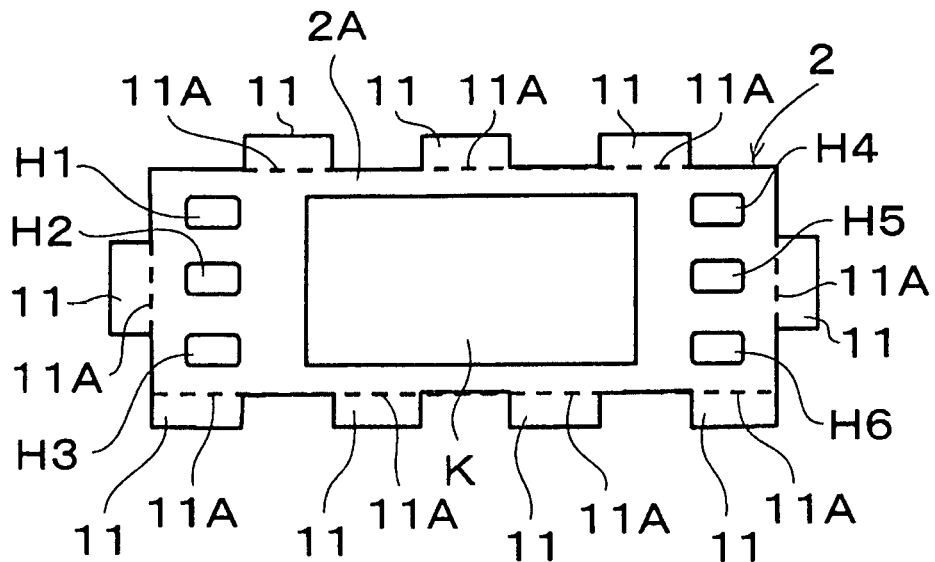
FIG. 8A is a plan view of a frame.

A fuel cell stack in FIG. 8A is configured such that a frame 2 comprises three protrusions 11 in one long side and four protrusions 11 in the other long side as with the fifth embodiment (see FIG. 5), and it further comprises a protrusion 11 in the center of each of the short sides.

Figure 8B:
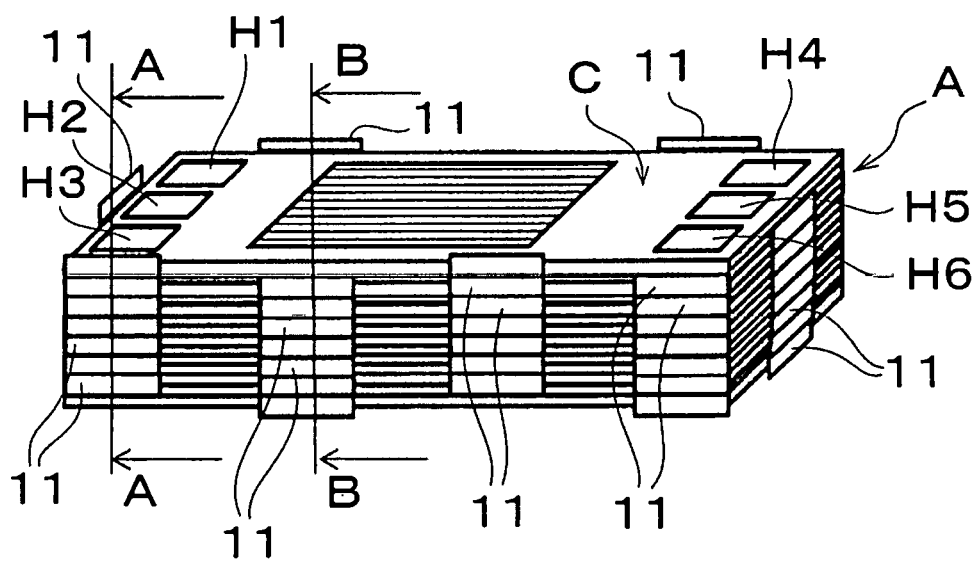
FIG. 8B is a perspective view of a stack of a fuel cell stack according to a sixth embodiment of the present invention.
Figure 8C:
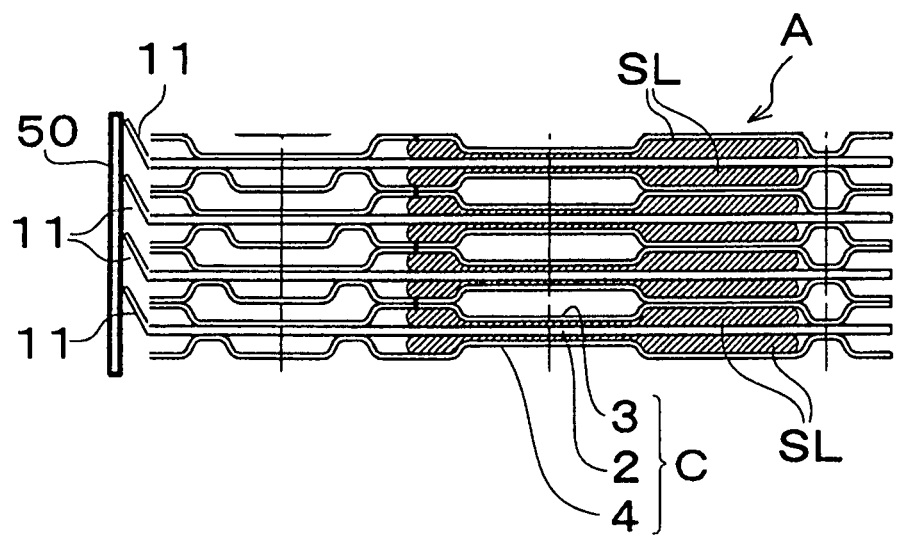
FIG. 8C is a cross-sectional view taken along the line A-A in FIG. 8B
Figure 8D:
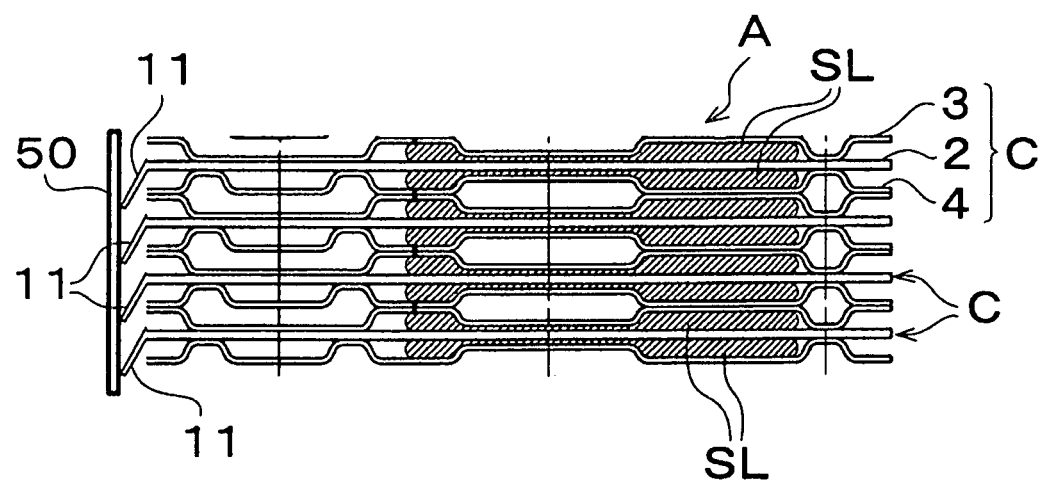
FIG. 8D is a cross-sectional view taken along the line B-B in FIG. 8B.

In the frames 2 stacked of the fuel cell stack, at least one column of protrusions 11 aligned in the stacking direction of single cells C is bent in a bent direction different from a bent direction of the other columns of the protrusions 11 as illustrated in FIG. 8B to FIG. 8D.

Specifically, of the three protrusions 11 in one long side of the frame 2 of the fuel cell stack, the protrusions 11 in the center column are bent downward in the figure while the protrusions 11 in the adjacent columns at the both sides are bent upward in the figure. Further, of the four protrusions 11 in the other long side of the frame 2, the protrusions 11 in the first and third columns are bent upward in the figure while the protrusions 11 in the second and fourth columns are bent downward in the figure. Further, in the short sides, the protrusions 11 in one short side are bent upward in the figure while the protrusions 11 in the other short side are bent downward in the figure.

In the fuel cell stack having the above-described configuration, the protrusions 11 can prevent a short circuit in the single cells C as with the previously-described embodiments. Further, in the fuel cell stack, since the protrusions 11 arrayed in the stacking direction are bent in different directions with respect to each column, the reaction force of the protrusions 11 that are bent acts on the individual single cells in a good balance when the stack A is housed in a case 50. This can prevent the frames 2 from at least uneven deformation more surely.

Seventh Embodiment

Figure 9A:
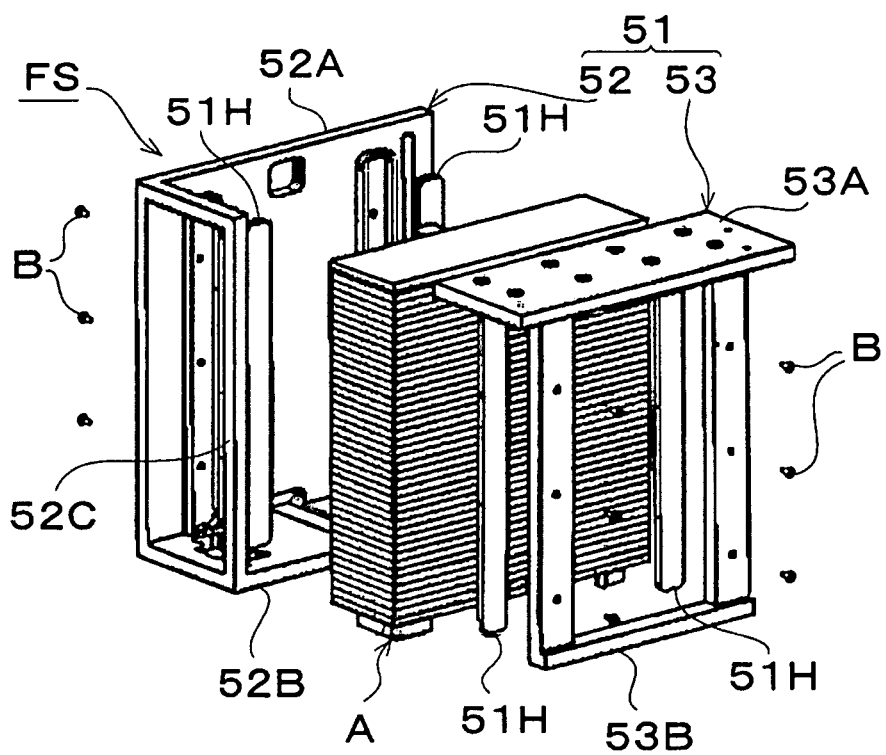
FIG. 9A is an exploded perspective view of a fuel cell stack according to a seventh embodiment of the present invention and FIG. 9B is a plan view of an upper frame and a lower frame.

A fuel cell stack FS in FIG. 9A comprises a frame case 51 that houses a stack A. The case 51 comprises a first case member 52 and a second case member 53 that fits with the first case member 52. The first case member 52 comprises a vertical wall plate 52A, a bottom plate 52B and a side frame 52C. The second case member 53 comprises a top plate 53A and a front frame 53B opposed to the wall plate 52A.

In the case 51, the stack A is disposed on the bottom plate 52B of the first case 52 such that the stacking direction of single cells C is vertical, and the second case member 53 is then fitted with the first case member 52. The case 51 thus holds the top and bottom faces of the stack A between the top plate 53A and the bottom plate 52B, the front and back faces of the stack A between the wall plate 52A and the front frame 53B and a side face of the stack A with the side frame 52C.

Figure 9B:
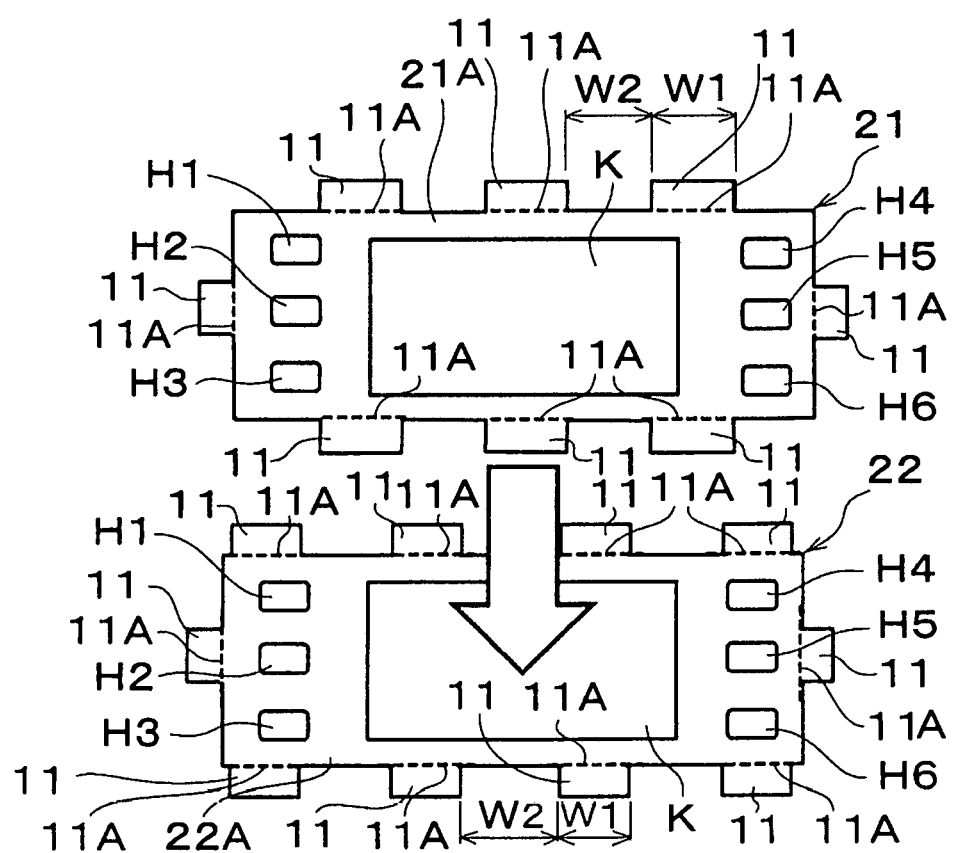

While the frames 2 of the single cells C have the same shape in the previously-described embodiments, the frames 2 of this embodiment are composed of first and second frames 21, 22 having different arrangements of protrusions 11 as illustrated in FIG. 9B.

That is, in the embodiment, the frame 21, which is illustrated in the upper side in FIG. 9B, comprises three protrusions 11 in each of the long sides of a frame body 21A and one protrusion 11 at a center of each of the short sides. The frame 22, which is illustrated in the lower side in FIG. 9B, comprises four protrusions 11 in each of the long sides of a frame body 22A and one protrusion 11 at a center of each of the short sides. In the frames 21, 22, the protrusions 11 in the long sides have approximately the same width W1, and the distance W2 between the protrusions 11 in the long sides is approximately equal to the width W1 of the protrusions 11.

Figure 10A:
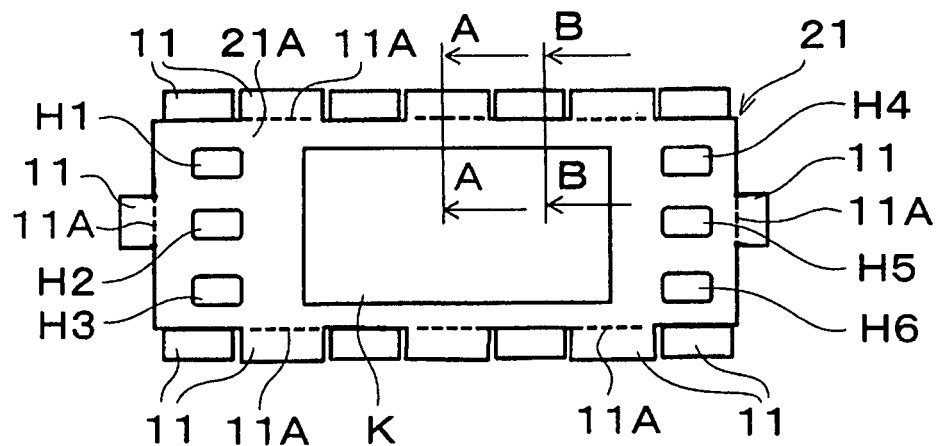
FIG. 10A is a plan view of the upper and lower frames in FIG. 9A and FIG. 9B in a stacked state.

In the fuel cell stack FS, single cells C with the first frames 21 and single cells C with the second frames 22 are alternately stacked. Accordingly, the first and second frames 21, 22 of the single cells C are arranged such that the protrusions 11 in the long sides are disposed between the protrusions 11 of adjacent frames 21, 22 as illustrated in the plan view of FIG. 10A.

For the above-described stack A, the case 51 comprises frame supports 51H that retain the protrusions 11 of the frames 2 in a bent state. The material and the shape of the frame supports 51H are not particularly limited. However, they may be constituted by insulating members such as plastic.

As illustrated in FIG. 9A, the frame supports 51H of the embodiment are strip members that are fixed to the wall plate 52A and the front frame 53B of the case 51 by bolts B. The frame supports 51H may be either independent from the case 51 as illustrated in the figure or integrated with the case 51. While FIG. 9A illustrates an example in which four frame supports 51H are provided, the actual number of frame supports 51H corresponds to the number of columns of the protrusions 11 in the stack A.

Figure 10B:
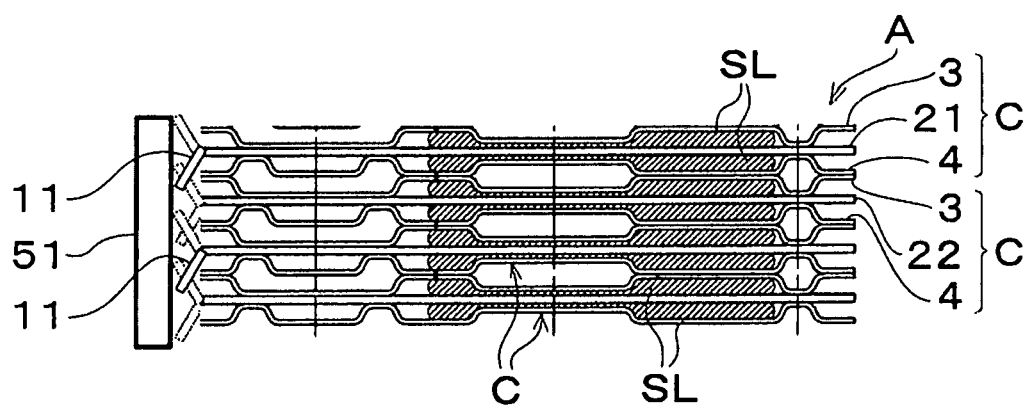
FIG. 10B is a cross-sectional view taken along the line A-A in FIG. 10A
Figure 10C:
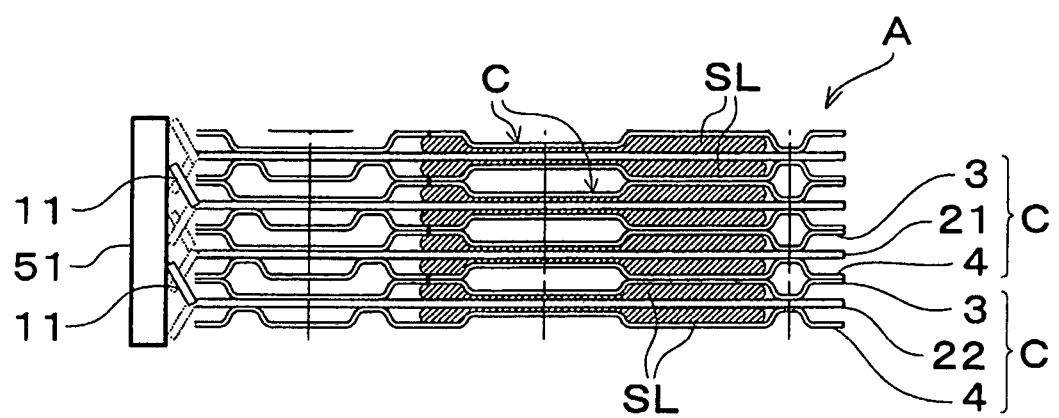
FIG. 10C is a cross-sectional view taken along the line B-B in FIG. 10A.

In the fuel cell stack FS, some frame supports 51H of the case 51 bend the protrusions 11 of the first frames 21 downward in the figure and retain them in the bent state as illustrated in FIG. 10B. Further, in the fuel cell stack FS, the other frame supports 51H of the case 51 bend the protrusions 11 of the second frames 22 upward in the figure and retain them in the bent state as illustrated in FIG. 10C. FIG. 10B and FIG. 10C are cross-sectional views respectively taken along the lines A-A and B-B in FIG. 10A, in which protrusions 11 in the cross sections are illustrated by solid lines while the other protrusions 11 behind the cross sections are illustrated by dotted lines.

In the fuel cell stack FS having the above-described configuration, the protrusions 11 can prevent a short circuit in the single cells C as with the previously-described embodiments. Further, the protrusions 11 are bent in different directions with respect to each column. This prevents at least the frames 2 from uneven deformation more surely. Further, in the fuel cell stack FS, the frame supports 51H retain the protrusions 11 of the frames 2 in a bent state. Therefore, the function of the protrusions 11 preventing a short circuit is surely maintained for a long time. Further, the protrusions 11 in the long sides of the first and second frames 21, 22 are arranged in a staggered pattern. This allows tightly and alternately arranging the frames 21, 22 in a frame material F as illustrated in FIG. 5 and FIG. 6 and thereby cutting them out of the same frame material F.

In the fuel cell stack FS having the above-described configuration, the frame supports 51H can be attached either before or after placing the stack A in the case 51. That is, the frame supports 51H are disposed in the case 51 beforehand, and the stack A is subsequently housed in the case 51 by moving it in the stacking direction. In this process, the frame supports 51H bend the protrusions 11 when the stack A is housed. After the stack A is completely housed, the frame supports 51H retains the protrusions 11 in the bent state.

Alternatively, the stack is housed in a predetermined position of the case 51, the frame supports 51H are subsequently inserted to the columns of the protrusions 11 so as to bend the protrusions 11, and the frame supports 51H are fixed on the case 51 so as to retain the protrusions 11 in the bent state.

When the protrusions 11 are bent in different directions with respect to each column as in the above-described embodiments, some of the frame supports 51H are disposed beforehand in the case 51 where the protrusions 11 are to be bent upward. The stack A is housed from above so that the protrusions 11 are bent upward. Thereafter, the other frame supports 51H are inserted to the place where the remaining protrusions 11 are arranged so as to bend the protrusions 11 downward.

The configuration of the fuel cell stack of the present invention is not limited to those of the above-described embodiments. Suitable changes can be made in the detailed configuration without departing from the features of the present invention, or the configurations of the above-described embodiments can be suitably combined.

REFERENCE SIGNS LIST

A Stack
C Single cell
F Frame material
FS Fuel cell stack
1 Membrane electrode assembly
2 Frame
2A Frame body
3, 4 Separator
11 Protrusion
11A Bendable portion
21 First frame
21A Frame body
22 Second frame
22A Frame body
50 Case
51 Case
51H Frame support

The invention claimed is:

1. A fuel cell stack comprising:
    a stack comprising single cells that are stacked, each of the single cells comprising a frame that holds an outer periphery of a membrane electrode assembly and a pair of separators sandwiching the membrane electrode assembly and the frame; and
    a case that houses the stack,
    wherein the frame comprises at least one protrusion that protrudes outward from an outer periphery of a frame body that constitutes the frame, beyond an outer peripheral edge of the pair of separators, the at least one protrusion integrated with the frame, and
    a protrusion length of the at least one protrusion is greater than at least a gap between the frame and one of the pair of separators, and the at least one protrusion is bendable with respect to the frame body.

2. The fuel cell stack according to claim 1, wherein the frame comprises a bendable portion at a bottom part of the at least one protrusion that is processed so as to subserve the protrusion to be bent.

3. The fuel cell stack according to claim 1, wherein the protrusion length is sufficient such that when the at least one protrusion is bent with respect to the frame, the at least one protrusion overlaps at least a part of a protrusion of an adjacent single cell.

4. The fuel cell stack according to claim 1,
    wherein each frame comprises a plurality of protrusions that are disposed at different parts of the frame body, and
    the stack comprises a plurality of frames stacked to form columns of protrusions, each of the columns of protrusions comprising at least one of the plurality of protrusions of each of the frames and aligned in a stacking direction of the single cells, and
    at least one of the columns of protrusions is bent in a bent direction different from a bent direction of the others of the columns of protrusions.

5. The fuel cell stack according to claim 1,
    wherein the frame body has a rectangular shape, and
    the frame comprises a plurality of protrusions arranged to extend from at least two parallel sides in a staggered pattern.

6. The fuel cell stack according to claim 1,
    wherein the frame comprises a plurality of protrusions disposed symmetrically with respect to an in-plane center of gravity of the frame body.

7. The fuel cell stack according to claim 5, wherein the frame is cut out of a continuous frame material, and the plurality of protrusions is disposed in a side that is perpendicular to a continuing direction of the frame material.

8. The fuel cell stack according to claim 6, wherein the frame is cut out of a continuous frame material, and the plurality of protrusions is disposed in a side that is perpendicular to a continuing direction of the frame material.

9. The fuel cell stack according to claim 1, wherein the case comprises a frame support that retains the at least one protrusion of the frame in a bent state.

10. The fuel cell stack according to claim 1, wherein the at least one protrusion is bent with respect to the frame body such that the at least one protrusion covers an end face of at least one of the pair of separators.

\* \* \* \* \*